(12) United States Patent
Miller et al.

(10) Patent No.: US 12,571,967 B2
(45) Date of Patent: Mar. 10, 2026

(54) OPTICAL COUPLERS WITH GRADIENT-INDEX LENSES AND METHODS OF FABRICATING THE SAME USING OPTICAL RADIATION TO CONTROL PITCH

(71) Applicant: CORNING RESEARCH & DEVELOPMENT CORPORATION, Corning, NY (US)

(72) Inventors: William James Miller, Horseheads, NY (US); Robert Adam Modavis, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 354 days.

(21) Appl. No.: 18/129,820

(22) Filed: Mar. 31, 2023

(65) Prior Publication Data

US 2024/0329321 A1 Oct. 3, 2024

(51) Int. Cl.
*G02B 6/32* (2006.01)
*G02B 6/26* (2006.01)

(52) U.S. Cl.
CPC .............. *G02B 6/32* (2013.01); *G02B 6/262* (2013.01)

(58) Field of Classification Search
CPC .................................. G02B 6/32; G02B 6/262
See application file for complete search history.

(56) References Cited

U.S. PATENT DOCUMENTS

| | | | | |
|---|---|---|---|---|
| 5,568,578 | A | * 10/1996 | Ames .................. | G02B 6/3604 |
| | | | | 385/25 |
| 6,014,484 | A | 1/2000 | Duck et al. | |
| 6,714,354 | B2 * | 3/2004 | Trotter, Jr. .......... | G02B 3/0087 |
| | | | | 359/376 |
| 7,154,083 | B2 | 12/2006 | Mizuno | |
| 7,336,988 | B2 * | 2/2008 | Schnitzer .......... | G02B 23/2446 |
| | | | | 600/478 |
| 7,357,005 | B2 * | 4/2008 | Matsumura ............. | G02B 6/32 |
| | | | | 385/74 |
| 8,432,542 | B2 * | 4/2013 | Marple .................... | G02B 6/32 |
| | | | | 356/417 |
| 8,774,579 | B2 * | 7/2014 | Benjamin ............. | G02B 6/322 |
| | | | | 385/33 |
| 9,250,390 | B2 * | 2/2016 | Muendel ............. | G02B 6/4216 |

(Continued)

FOREIGN PATENT DOCUMENTS

CA 2256886 C 2/2005

OTHER PUBLICATIONS

Palais, "Fiber coupling using graded-index rod lenses", Applied Optics, vol. 19, No. 12, Jun. 1980, pp. 2011-2018.

(Continued)

*Primary Examiner* — Andrew Jordan
(74) *Attorney, Agent, or Firm* — Kapil U. Banakar

(57) ABSTRACT
Optical couplers having a gradient-index (GRIN) lens and methods of their fabrication are disclosed. In one embodiment, a method of fabricating an expanded beam coupler for propagating an optical signal having a wavelength includes attaching a gradient-index lens to an end-face of an optical fiber, the gradient-index lens having a pitch length that is less than one-quarter, and applying optical radiation to the gradient-index lens until the pitch length of the gradient-index lens is one-quarter.

22 Claims, 7 Drawing Sheets

(56) References Cited

U.S. PATENT DOCUMENTS

| | | | | |
|---|---|---|---|---|
| 9,823,421 | B2 * | 11/2017 | Floris | G02B 6/32 |
| 9,823,422 | B2 * | 11/2017 | Muendel | G02B 6/4216 |
| 10,105,918 | B2 * | 10/2018 | Thind | G02B 1/12 |
| 11,360,269 | B2 * | 6/2022 | Faulhaber | G02B 6/4296 |
| 11,484,192 | B2 * | 11/2022 | Shimamoto | A61B 1/07 |
| 11,940,652 | B2 * | 3/2024 | Faulhaber | B23K 26/0626 |
| 2002/0146202 | A1 * | 10/2002 | Reed | G02B 6/14 |
| | | | | 385/34 |
| 2004/0032669 | A1 * | 2/2004 | Trotter, Jr. | G02B 3/0087 |
| | | | | 359/653 |
| 2004/0174609 | A1 * | 9/2004 | Trotter, Jr. | G02B 6/32 |
| | | | | 359/654 |
| 2004/0175073 | A1 * | 9/2004 | Grinderslev | G02B 6/32 |
| | | | | 385/74 |
| 2007/0147733 | A1 * | 6/2007 | Matsumura | G02B 6/32 |
| | | | | 385/34 |
| 2011/0206068 | A1 * | 8/2011 | Tanaka | H01S 3/094015 |
| | | | | 385/33 |
| 2012/0176613 | A1 * | 7/2012 | Marple | G02B 6/32 |
| | | | | 385/33 |
| 2013/0148925 | A1 * | 6/2013 | Muendel | G02B 6/4216 |
| | | | | 385/27 |
| 2013/0272655 | A1 * | 10/2013 | Floris | G02B 6/32 |
| | | | | 385/33 |
| 2014/0086530 | A1 * | 3/2014 | Benjamin | G02B 6/322 |
| | | | | 29/428 |
| 2014/0319708 | A1 * | 10/2014 | Thind | G02B 3/0087 |
| | | | | 264/1.36 |
| 2016/0116679 | A1 * | 4/2016 | Muendel | B23K 26/0626 |
| | | | | 385/11 |
| 2016/0161678 | A1 * | 6/2016 | Lu | G02B 6/3853 |
| | | | | 385/79 |
| 2019/0335986 | A1 * | 11/2019 | Shimamoto | G02B 26/103 |
| 2020/0284986 | A1 * | 9/2020 | Faulhaber | B23K 26/0648 |
| 2022/0299710 | A1 * | 9/2022 | Faulhaber | G02B 3/0087 |
| 2024/0003994 | A1 * | 1/2024 | Miyamoto | G02B 6/024 |
| 2024/0329321 | A1 * | 10/2024 | Miller | G02B 6/262 |

OTHER PUBLICATIONS

Gilsdorf Robert, et al., "Single-mode fiber coupling efficiency with graded-index rod lenses", Applied Optics, vol. 33, No. 16, Jun. 1994, pp. 3440-3445.

* cited by examiner

OPTICAL COUPLERS WITH GRADIENT-INDEX LENSES AND METHODS OF FABRICATING THE SAME USING OPTICAL RADIATION TO CONTROL PITCH

FIELD

The disclosure is directed to optical couplers and, more particularly, to optical couplers having a gradient-index lens and methods of their fabrication.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

Single-mode optical fiber connectors suffer from the issue of debris being present on the end-face of the optical fiber. Very small contaminants (e.g., on the order of tens of microns) can obscure a large percentage of the exiting beam. To account for this, expanded beam optical couplers expand the laser beam that leaves the optical coupler. One or more lensing elements expand and collimate the laser beam. One type of lens element capable of performing this function is a gradient-index (GRIN) lens, which is attached to the end-face of a single-mode optical fiber. However, to produce collimated light, the GRIN lens should have a one-quarter pitch length. Deviation from a one-quarter pitch length creates coupling losses because the light beam will not be collimated. Fabrication of GRIN lenses having a precise one-quarter pitch and then fusion splicing of this small GRIN lens (on the order of hundreds of microns in length) are difficult tasks to achieve. Thus, yield may be low and manufacturing costs may be high.

Consequently, there exists an unresolved need for alternative methods of fabricating optical couplers having a GRIN lens.

SUMMARY

Various embodiments of optical couplers and methods of fabricating optical are disclosed. In embodiments of the present disclosure, the pitch length of a fiber GRIN lens is increased by UV exposure after the fiber GRIN lens is attached to an end-face of an optical fiber. This change in pitch length may be precisely controlled yielding a GRIN lens with the optimum pitch, which further yields an optical connector with very low coupling loss. In other embodiments, the optical power of a shorter-than-desired GRIN lens can be increased by using a laser to convert the flat output end-face of the GRIN to a convex end-face to increase optical power to overcome the underpowered GRIN lens due to the short pitch length. Additionally, a GRIN lens with a pitch length longer than the optical one-quarter pitch length may have its pitch length reduced by thermal diffusion enacted by laser treatments.

In one embodiment, a method of fabricating an expanded beam coupler for propagating an optical signal having a wavelength includes attaching a gradient-index lens to an end-face of an optical fiber, the gradient-index lens having a pitch length that is less than one-quarter, and applying optical radiation to the gradient-index lens until the pitch length of the gradient-index lens is one-quarter.

In another embodiment, a method of fabricating an expanded beam coupler for propagating an optical signal having a wavelength includes attaching a gradient-index lens to an end-face of an optical fiber, the gradient-index lens having a pitch length that is greater than one-quarter, and applying optical radiation to the gradient-index lens to thermally diffuse a dopant within the gradient-index lens until the pitch length of the gradient-index lens is one-quarter.

In yet another embodiment, a method of fabricating an expanded beam coupler for propagating an optical signal having a wavelength includes attaching a gradient-index lens to an end-face of an optical fiber, the gradient-index lens having a pitch length that is less than one-quarter, and applying optical radiation to an end-face of the gradient-index lens to form a convex shape at the end-face such that a coupling loss of the gradient-index lens is about 0%.

In yet another embodiment, an optical coupler for propagating an optical signal having a wavelength includes an optical fiber having an end-face, and a gradient-index lens attached to the end-face of the optical fiber, the gradient-index lens having a pitch length that is greater than or less than one-quarter.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

Figure 1:
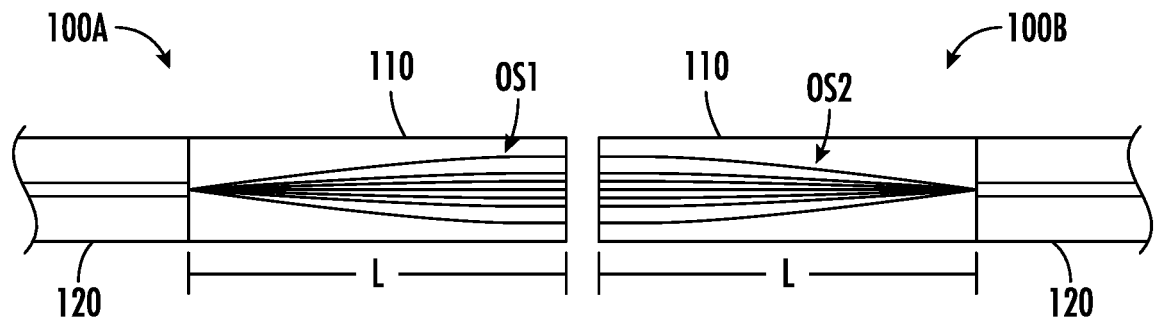
FIG. 1 illustrates two optical couplers in a mated relationship according to one or more embodiments described and illustrated herein.

References will now be made in detail to the embodiments of the disclosure, examples of which are illustrated in the accompanying drawings. Whenever possible, like reference numbers will be used to refer to like components or parts.

The concepts disclosed are related to expanded beam optical couplers and methods of their manufacture. One of the significant problems with proximity (i.e., contact) single-mode optical connectors is the possibility of small contaminants (on the order of ten micro-meter) on the fiber end-face obscuring all or at least a large fraction of the exiting beam. These small contaminants may include dust, particles and moisture, for example.

To mitigate this type of problem, expanded beam optical couplers have been devised in which the beam exiting the optical connector has a diameter that is five to ten times larger than that of the single-mode fiber. In that case, any particle of approximately ten $\mu m$ in size that might intervene between a mated pair of connectors will only reduce the intensity by a small amount. These expanded beam connectors consist of an optical fiber in contact (index-matched, or nearly so) with a lensing element. The lensing element can be a homogeneous material with a convex curved output face or a gradient index (GRIN) lens (bulk or fiber) with a planar output face.

Regardless of the lensing method, the goal is to produce an optical connector or coupler which collimates the light from the optical fiber with a beam size several tens of micro-meters in diameter. For the fiber GRIN optical coupler, the GRIN lens should have a one-quarter pitch length in order to provide collimated light. In practice, it is difficult to precisely obtain this pitch length when attaching to the fiber because of limitations in the precision obtainable in physical length and variations in the index profile of the GRIN lens. These factors significantly limit the performance of the device, and make it difficult, time consuming and costly to manufacture the devices.

Embodiments improve the performance of optical couplers having GRIN lenses as well as the method of their manufacture. More particularly, embodiments of the present disclosure provide processes in which the pitch length of the GRIN lens in a fiber-GRIN connector (also referred to herein as an optical coupler) is precisely tuned to the desired one-quarter pitch optical length. This is achieved by purposely attaching a fiber GRIN lens to an end-face of an optical fiber (via fusion splice, for example) with a pitch length somewhat less than the desired one-quarter pitch length. Next, in some embodiments, the index of refraction of the GRIN lens is increased by exposure to ultraviolet (UV) irradiation by way of the photosensitive effect. This increase in index increases the pitch length of the fiber GRIN lens. The UV exposure is terminated once the fiber GRIN lens has attained the desired pitch length.

This procedure removes the requirement for fiber GRIN lenses with precise pitch lengths, which is difficult to achieve because of variations in the manufacture of optical couplers. The inherent variability in the pitch length of the GRIN lenses (with somewhat shorter than one-quarter pitch length) is compensated by the time of UV exposure in the embodiments of the present disclosure.

Monitoring the coupling efficiency of the output of the fiber-GRIN optical coupler while it is being UV irradiated enables improved control over the pitch length. The ability to precisely control the pitch length results in optical connectors with reduced coupling loss as compared with conventional devices. Furthermore, the performance is expected to be improved over conventional fiber-lens expanded beam couplers because of the difficulty in those devices of aligning the fiber axis with the lens axis. Fusion splicing between the fiber and GRIN lens results in excellent alignment of the axes of these components since the concentricity error of each of these is very low ($\ll 1$ $\mu m$).

While the methods disclosed herein are suitable for single fiber connectors it can also be applied to multiple fiber devices, for example, 12 fiber MTP connectors. For either case, the existing housing only has the addition of a spacer to accommodate the expanded beam fiber GRIN device. This enables a relatively simple modification of existing technology which is another advantage of the fiber GRIN-based expanded beam method.

Various embodiments of methods for precisely controlling the pitch length of a GRIN lens are described in detail below.

Referring now to FIG. 1, a first optical coupler 100A and a second optical coupler 100B are illustrated. The first and second optical couplers 100A, 100B, which may be integrated into an optical connector, for example, each comprise a single-mode optical fiber 120 and a GRIN lens 110 attached to an end-face of the optical fiber 120. The GRIN lenses 110 may be fabricated from a multi-mode optical fiber stub, for example. FIG. 1 illustrates a first optical signal OS1 in the GRIN lens 110 of the first optical coupler 100A and a second optical signal OS2 in the GRIN lens 110 of the second optical coupler 100B. The end-faces of the GRIN lenses 110 may contact or nearly contact one another to optically couple the first optical coupler 100A and the second optical coupler 100B.

Figure 2:
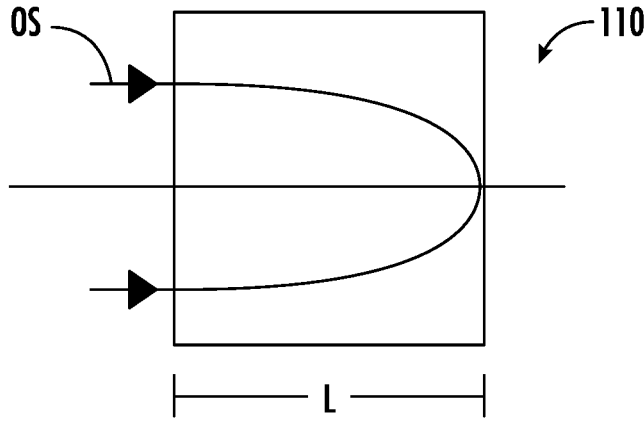
FIG. 2 illustrates a gradient-index (GRIN) lens having a one-quarter pitch length according to one or more embodiments described and illustrated herein.

The GRIN lenses 110 have a length L, which, along with the index of refraction, dictate the pitch length. Referring to FIG. 2, the GRIN lens should have a one-quarter pitch length to achieve collimated light. As stated above, it is difficult to manufacture a GRIN lens having this tight requirement as well as attach it to an end-face of an optical fiber. Embodiments of the present disclosure manipulate the pitch length of the GRIN lens 110 after it is attached to an optical fiber.

Figure 3:
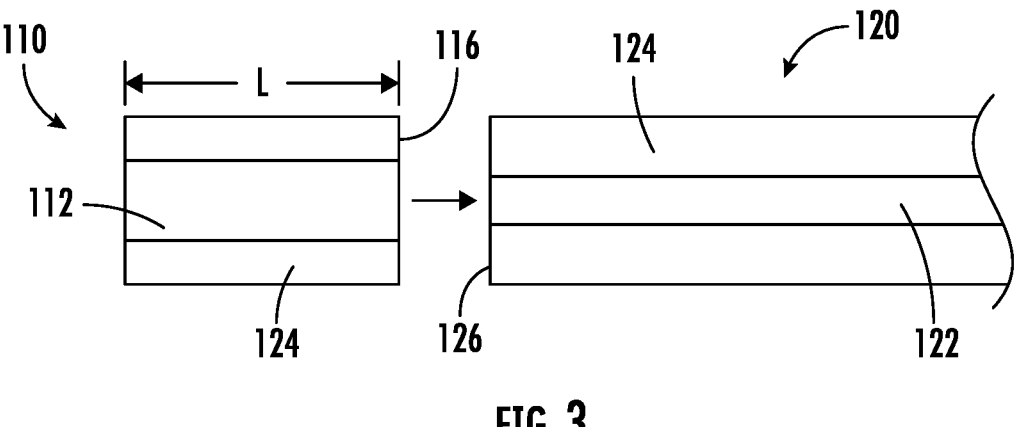
FIG. 3 illustrates a step of attaching a GRIN lens to an end-face of an optical fiber according to one or more embodiments described and illustrated herein.
Figure 4:
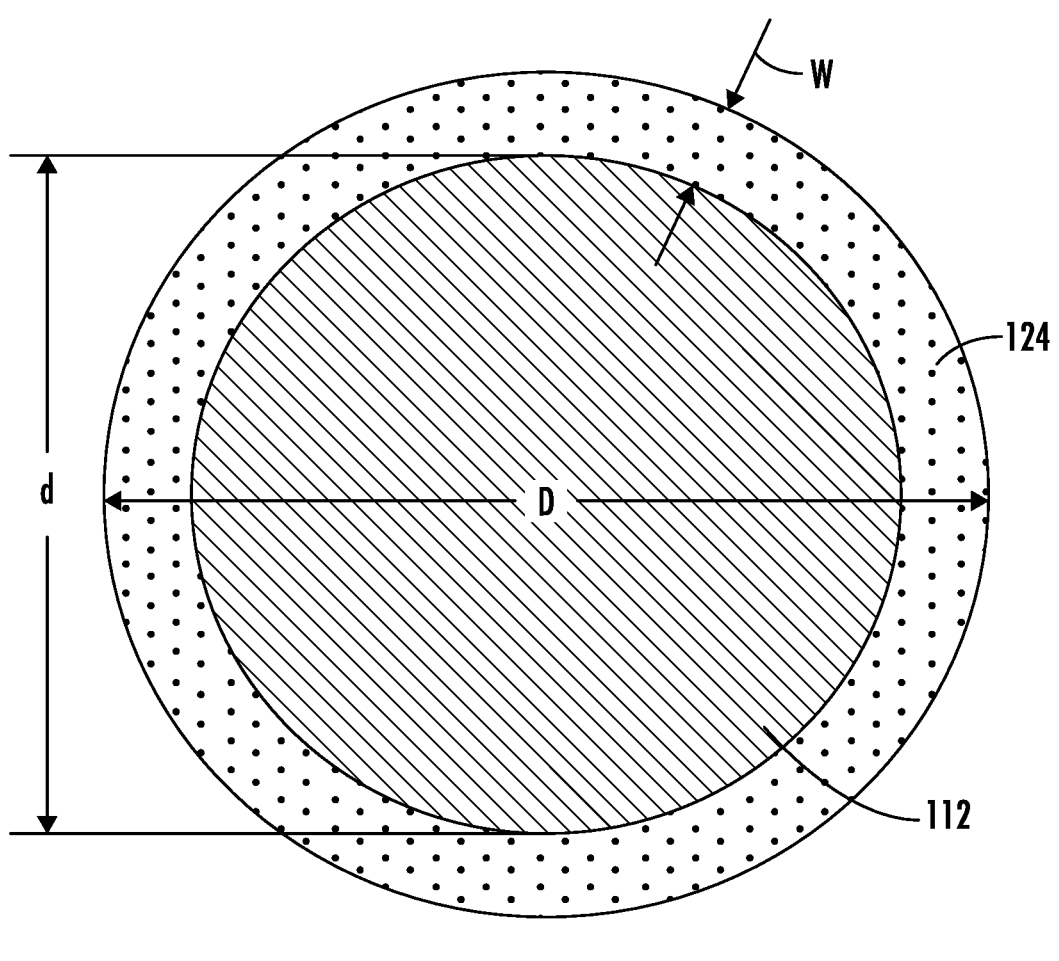
FIG. 4 illustrates a cross-sectional view of a GRIN lens according to one or more embodiments described and illustrated herein.

Referring now to FIG. 3, the embodiments described herein comprise attaching an end-face 116 of a GRIN lens 110 to an end-face 126 of an optical fiber 120. The GRIN lens 110 may be attached to the end-face 126 by a fusion splice process, for example. The optical fiber 120 may be a single-mode optical fiber having a core 122 and an outer cladding 124. The GRIN lens 110 may be a multi-mode optical fiber stub, for example. FIG. 4 is a cross-sectional view of an example GRIN lens 110 showing a multi-mode core 112 having a diameter d, a cladding having a width w, and an outer diameter D.

As a non-limiting example, the GRIN lens may be fabricated from a multi-mode optical fiber having a multi-mode core with a diameter d equal to about 105 μm and a cladding having a width of about 10 μm to provide an outer diameter D of about 125 μm.

Figure 5:
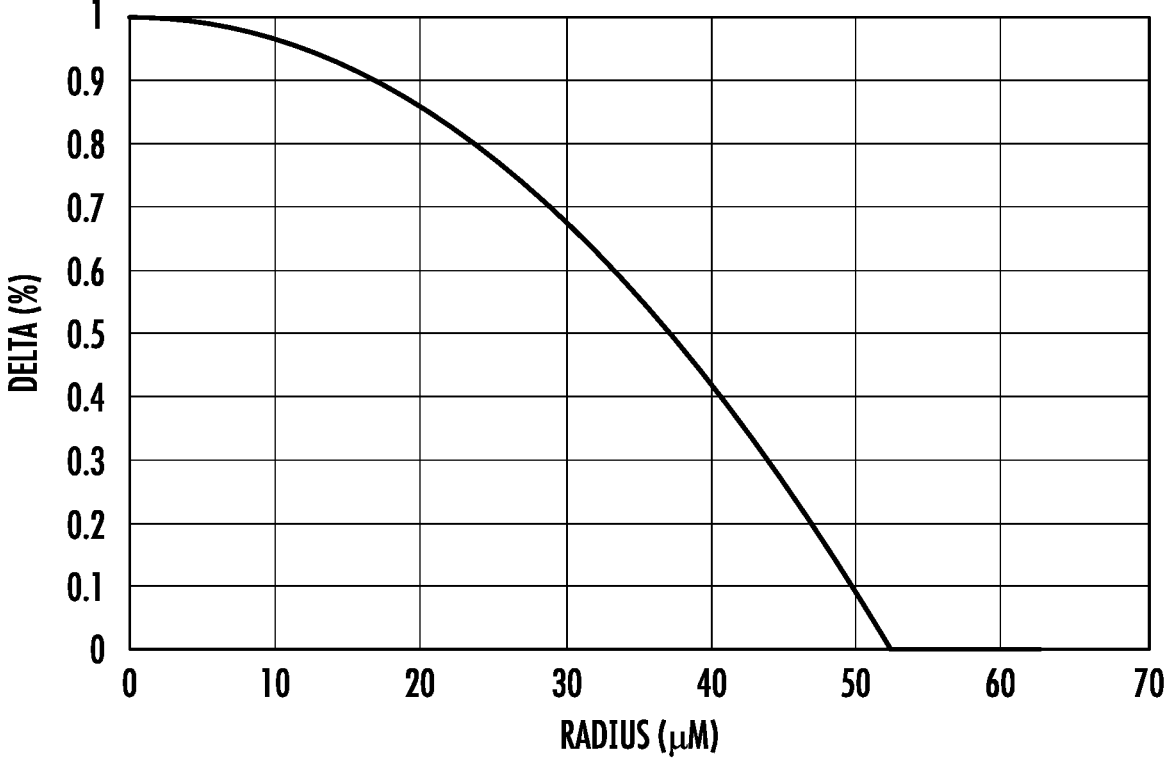
FIG. 5 illustrates a graph showing a parabolic index profile of an example GRIN lens according to one or more embodiments described and illustrated herein.

FIG. 5 is a graph illustrating a parabolic index profile of an example GRIN lens. The y-axis is the index delta in percent between the index of refraction of the core 122 and the cladding 124 and the x-axis is the radius. The peak index delta is 1% and the radius of the profile is 52.5 μm. A GRIN lens having this index profile and the dimensions above will have a one-quarter pitch length of about 823 μm, and will generate an output beam with a diameter of about 65 μm, which is a size typical of conventional expanded beam optical connectors. With these constraints, the light exiting the single-mode optical fiber 120 is collimated as it exits the GRIN lens 110. The second optical coupler of a mated pair receives the collimated light and focuses it into the core of the single-mode receiver optical fiber, as shown in FIG. 1.

An error in the pitch length of the fiber GRIN lens 110 will cause the light to either diverge (pitch too small) or converge (pitch too large), resulting in a coupling loss. This type of error frequently occurs in this type of device because of the difficulty in fabricating a fiber GRIN (to be spliced onto the fiber) with the exact ¼ pitch length. The Embodiments provide methods in which this limitation can be overcome.

Germania (the dopant commonly used to create various index profiles in fibers) is photosensitive to UV light. The amount of photosensitivity (i.e., index change) induced is proportional to the concentration of Germania and to the UV exposure time (up to the point of saturation). Given that the shape of the index profile (and Germania concentration) in the fiber GRIN is parabolic, an exposure to UV irradiation will maintain the parabolic shape of the profile but with a higher amplitude. This higher amplitude parabolic profile will cause the pitch of the fiber GRIN (of a given length) to increase.

In embodiments of the present disclosure, to fabricate an optical coupler with a GRIN lens having a one-quarter pitch length, an optical fiber is made with a somewhat lower peak index delta than the optimal design value, for example 0.3% to 0.9% rather than 1%. This optical fiber is cut to a length L, such as about 823 μm using the design parameters above (the design one-quarter pitch length had the optical fiber been fabricated with the optical design value for the peak index delta). The resulting optical fiber stub is then attached to a single-mode optical fiber 120, such as by fusion splicing.

Figure 6:
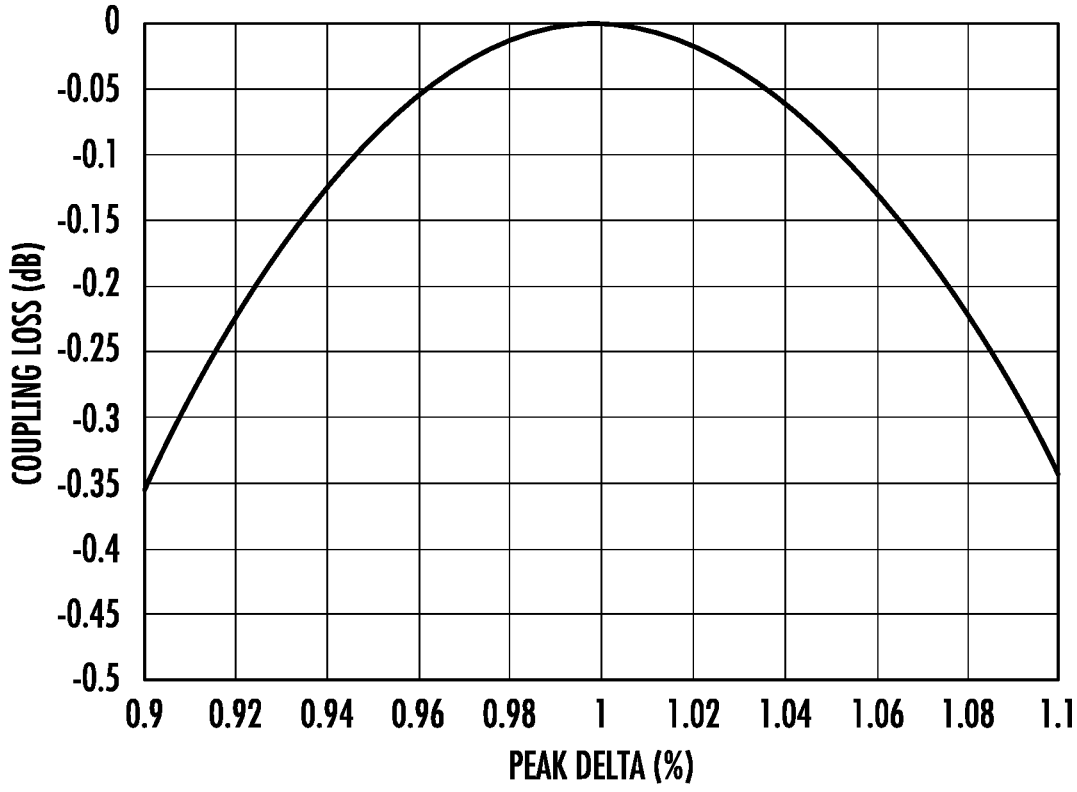
FIG. 6 illustrates a graph showing coupling loss as a function of peak index delta of a GRIN lens according to one or more embodiments described and illustrated herein.

FIG. 6 illustrates the coupling loss as a function of peak index delta for a GRIN lens having the design parameters described above. As is, the coupling loss of this optical coupler when mated to a mated optical coupler of the proper design is shown in FIG. 6 to be about 0.35 dB owing to the fact that the fiber GRIN pitch length is shorter than the desired one-quarter pitch length.

Figure 7A:
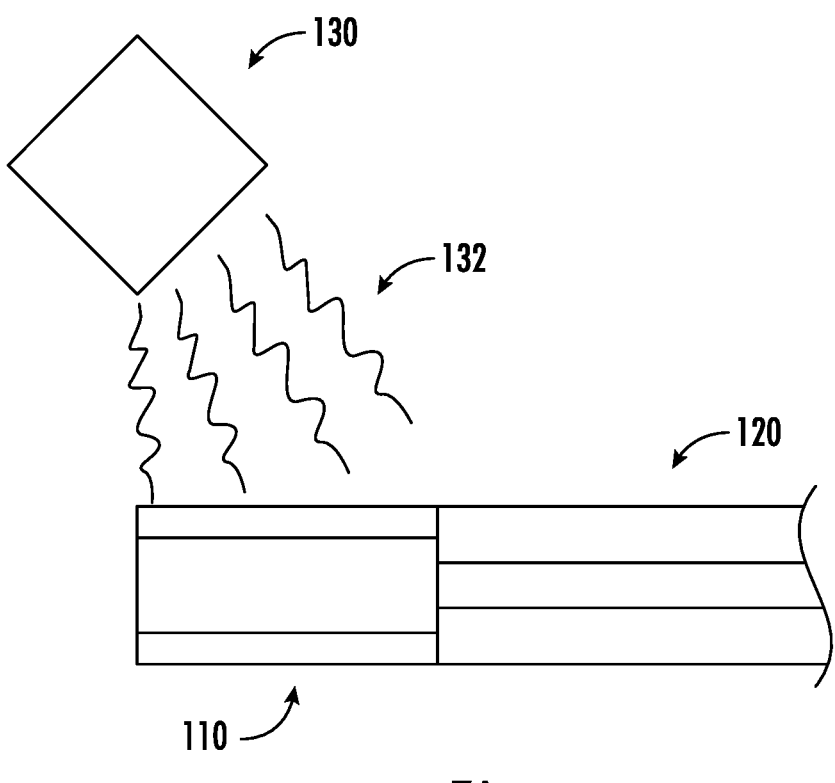
FIG. 7A illustrates ultra-violet irradiation asymmetrically provided to a GRIN lens attached to a single-mode optical fiber to manipulate an index profile of the GRIN lens according to one or more embodiments described and illustrated herein.
Figure 7B:
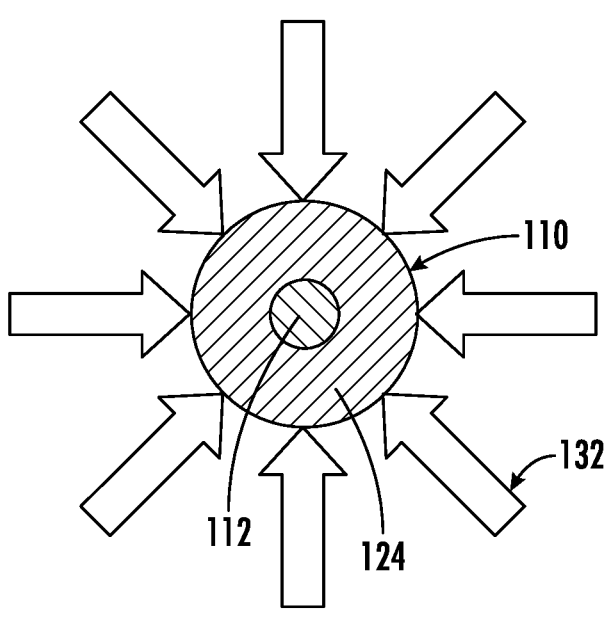
FIG. 7B illustrates ultra-violet irradiation symmetrically provided to a GRIN lens attached to a single-mode optical fiber to manipulate an index profile of the GRIN lens according to one or more embodiments described and illustrated herein.

After attaching the fiber GRIN lens 110 to the optical fiber 120, the GRIN lens 110 is exposed to UV optical radiation 132 from a UV source 130. FIG. 7A illustrates asymmetrically applied UV optical radiation 132 about the fiber GRIN lens 110 while FIG. 7B illustrates symmetrically applied UV optical radiation 132 about the fiber GRIN lens 110. By exposing the GRIN lens 110 to UV irradiation, the index profile increases, and when the peak index delta equals 1%, the coupling loss is minimized. In this manner, the desired one-quarter pitch length can be precisely obtained. Symmetric irradiation prevents unwanted beam steering caused by inducing an asymmetric index profile to the GRIN lens 110. However, in some cases beam steering may be beneficial, such as to correct for any beam tilt error in the mating optical connector. In such cases, asymmetrical UV optical radiation 132 may be applied as shown in FIG. 7A such that the laser beam within the GRIN lens is steered in a desired direction.

Figure 8:
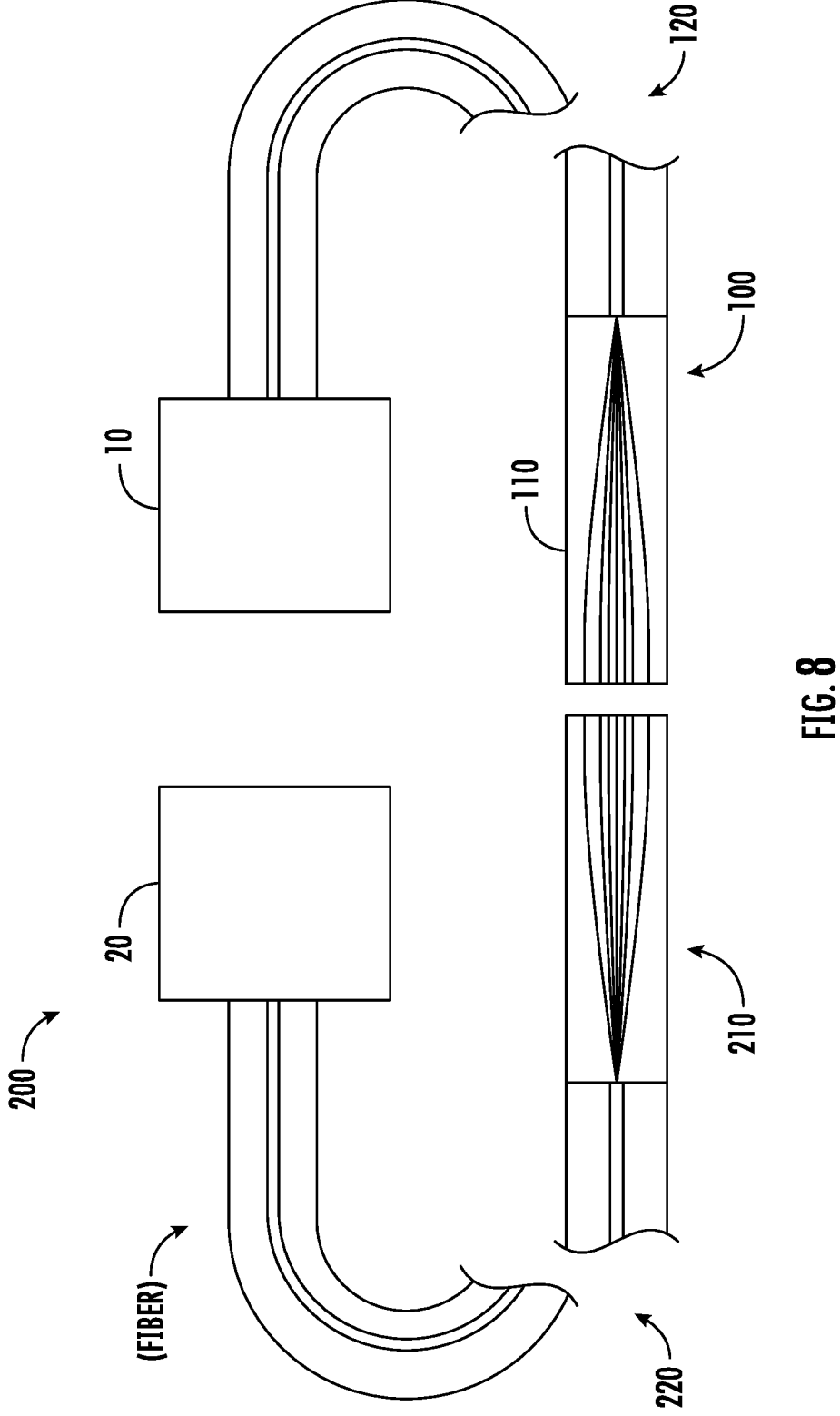
FIG. 8 illustrates an example optical coupler and an example detector system for monitoring a coupling efficiency of the optical coupler according to one or more embodiments described and illustrated herein.

FIG. 8 illustrates an example set-up for monitoring the coupling efficiency of the optical coupler 100 as the UV irradiation is provided such that the change in the index profile results in the optimal pitch length. A detector system 200 is optically coupled to the optical coupler 100. The example detector system 200 includes a GRIN lens 210 for coupling to the GRIN lens 110 of the optical coupler 100, a single-mode optical fiber 220 coupled to the GRIN lens 210 at one end, and a sensor 20 coupled to the other end of the single-mode optical fiber 220. The single-mode optical fiber 120 of the optical coupler 100 is coupled to a light source 10 that propagates an optical signal into the single-mode optical fiber 120. The sensor 20 may be configured to detect optical power to determine when the pitch length of the GRIN lens is such that the optical coupler 100 has achieved maximum coupling efficiency. The index profile of the GRIN lens is modified by the UV irradiation until the detector system 200 indicates maximum coupling efficiency.

Rather than starting with a GRIN lens having a pitch length that is less than one-quarter, in some embodiments a GRIN lens may be fabricated with a pitch length that is greater than a one-quarter of the wavelength of the optical signal. For example, the pitch length may be such that the peak index delta is 1.1%. The index profile of the GRIN lens may be lowered by thermally diffusing the Germania dopant using a laser light source, such as an infrared laser light source (e.g., $CO_2$ or quantum cascade laser sources). The index profile of the GRIN lens is lowered until the pitch length is reduced to the designed one-quarter pitch length. The detector system 200 shown in FIG. 8 may be used to determine when maximum coupling efficiency is achieved.

Figure 9:
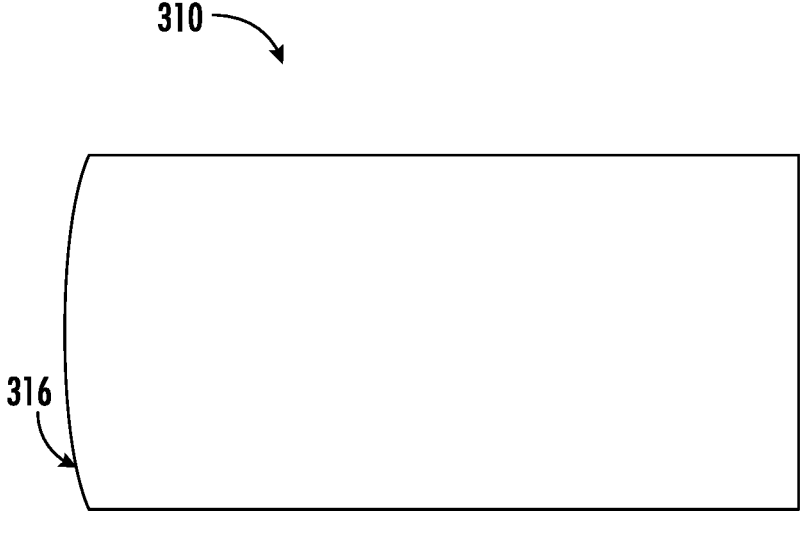
FIG. 9 illustrates an example GRIN lens having a convex end-face for accommodating a short pitch length of the GRIN lens according to one or more embodiments of the present disclosure.

In other embodiments, rather than changing an index profile of the GRIN lens, the end-face of the GRIN lens is manipulated by a laser source to have a convex shape. Referring to FIG. 9, an example GRIN lens 310 is shown. The GRIN lens 310 has a pitch length that is less than the desired one-quarter pitch length. An infrared laser light source (e.g., $CO_2$ or quantum cascade laser sources) is controlled to produce a laser beam that is incident on the end-face 316 of the GRIN lens 310 to cause the end-face 316 to be slightly convex. The convex end-face 316 provides extra optical power to overcome the slightly underpowered GRIN lens 310. A detector system such as the detector system 200 of FIG. 8 may be used to determine when the coupling loss reaches a minimum value, such as within a range of 0 dB to –0.5 dB, including endpoints.

The wavelength of a $CO_2$ laser is within a range of 9 to 11 μm (typically 10.6 microns) and a quantum cascade laser typically has wavelength greater than 2 μm. At the IR laser wavelengths, germania silica is highly absorbing so that irradiation will elevate the temperature (to about 1200 to 1600 deg. C.) so that diffusion can occur in a reasonable time period (on the order of minutes), thereby reducing the pitch length of the GRIN to the desired one-quarter pitch. Similarly, the same apparatus can be used to illuminate the endface of the GRIN so that the germania glass softens allowing the surface tension to create the desired convex surface. For both of the above, the same monitoring scheme mentioned previously can be used to determine when the optimum effect has been realized.

Figure 10:
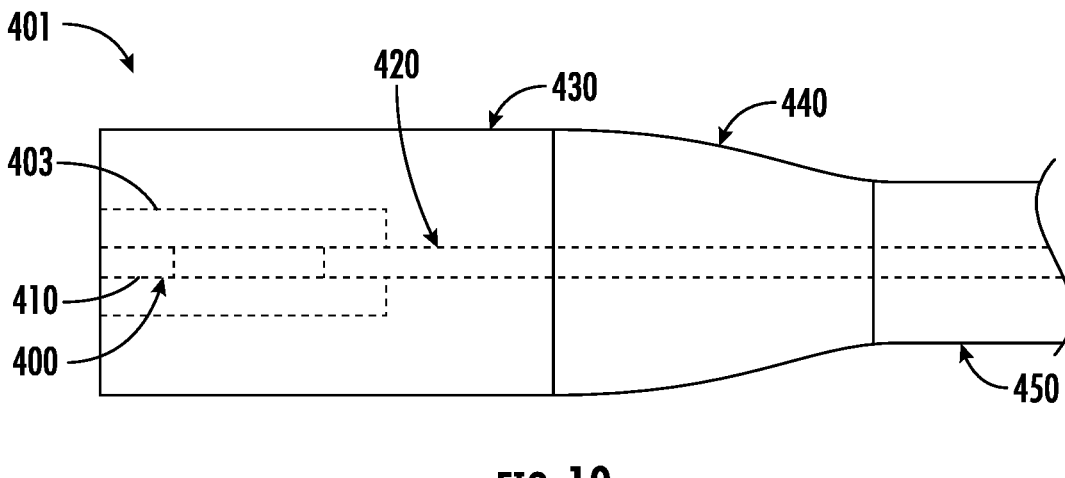
FIG. 10 illustrates an example optical connector having an optical coupler according to one or more embodiments described and illustrated herein.

The optical couplers described herein may be incorporated into fiber optic connectors, for example. Referring now to FIG. 10, an example optical connector 401 includes an optical coupler 400 having a GRIN lens 410 coupled to a single-mode optical fiber 420. The GRIN lens 410 and a portion of the optical fiber 420 are maintained within a fiber ferrule 403. In some embodiments, a spacer 412 is provided forward of the GRIN lens 410 to provide clearance for the expanded beams to be launched and received. The spacer 412, which is optically transparent to the wavelength of the optical signal, may have a length on the order of tens of micrometers. The GRIN lens 410, fiber ferrule 403, and a portion of the single-mode optical fiber 420 is maintained within a connector housing 430, which may be fabricated from a rigid plastic, for example. A boot 440 may be coupled to the connector housing 430 to provide strain relief for an optical cable 450 that maintains the single-mode optical fiber 420. The optical connector 401 may be a single-fiber optical connector or a multi-fiber optical connector. The optical connector 401 may take on any connector configuration, such as SC, LC, MTP, and the like.

It should now be understood that embodiments of the present disclosure are directed to methods of fabricating optical couplers having GRIN lenses with precise pitch lengths for maximum coupling efficiency. In embodiments of the present disclosure, the pitch length of a fiber GRIN lens is increased by UV exposure after the fiber GRIN lens is attached to an end-face of an optical fiber. This change in pitch length may be precisely controlled yielding a GRIN lens with the optimum pitch, which further yields an optical connector with very low coupling loss. In other embodiments, the optical power of a shorter-than-desired GRIN lens can be increased by using a laser to convert the flat output end-face of the GRIN to a convex end-face to increase optical power to overcome the underpowered GRIN lens due to the short pitch length. Additionally, a GRIN lens with a pitch length longer than the optical one-quarter pitch length may have its pitch length reduced by thermal diffusion enacted by laser treatments.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is also noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is further noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A method of fabricating an expanded beam coupler for propagating an optical signal having a wavelength, the method comprising:

attaching a gradient-index lens to an end-face of an optical fiber, the gradient-index lens having a pitch that is less than one-quarter; and applying optical radiation to the gradient-index lens until the pitch of the gradient-index lens is one-quarter.

2. The method of claim 1, wherein the optical radiation is ultraviolet radiation.

3. The method of claim 1, wherein the gradient-index lens has an outer diameter of about 125 μm, a core having a diameter of about 115 μm and a cladding having a width of about 10 μm.

4. The method of claim 3, wherein the gradient-index lens has a length of about 823 μm.

5. The method of claim 3, wherein the pitch prior to receiving the optical radiation provides a peak index delta of less than 1%.

6. The method of claim 5, wherein the pitch prior to receiving the optical radiation provides the peak index delta of about 0.9%.

7. The method of claim 1, wherein the optical radiation is applied such that an index profile of the gradient-index lens increases until a peak index delta equals about 1%.

8. The method of claim 1, further comprising optically coupling the gradient-index lens with a sensor capable of monitoring a coupling efficiency to determine when the pitch of the gradient-index lens is one-quarter.

9. A method of fabricating an expanded beam coupler for propagating an optical signal having a wavelength, the method comprising:

attaching a gradient-index lens to an end-face of an optical fiber, the gradient-index lens having a pitch that is greater than one-quarter; and applying optical radiation to the gradient-index lens to thermally diffuse a dopant within the gradient-index lens until the pitch of the gradient-index lens is one-quarter.

10. The method of claim 9, wherein the gradient-index lens has an outer diameter of about 125 μm, a core having a diameter of about 115 μm and a cladding having a width of about 10 μm.

11. The method of claim 10, wherein the gradient-index lens has a length of about 823 μm.

12. The method of claim 10, wherein the pitch prior to receiving the optical radiation provides a peak index delta greater than 1%.

13. The method of claim 10, wherein the optical radiation is applied such that an index profile of the gradient-index lens decreases until a peak index delta equals about 1%.

14. The method of claim 9, further comprising optically coupling the gradient-index lens with a sensor capable of monitoring a coupling efficiency to determine when the pitch of the gradient-index lens is one-quarter.

15. A method of fabricating an expanded beam coupler for propagating an optical signal having a wavelength, the method comprising:

attaching a gradient-index lens to an end-face of an optical fiber, the gradient-index lens having a pitch that is less than one-quarter; and applying optical radiation to an end-face of the gradient-index lens to form a convex shape at the end-face such that a coupling loss of the gradient-index lens is 0 dB to 0.5 dB, including endpoints.

16. The method of claim 15, wherein the optical radiation is infrared radiation.

17. The method of claim 15, wherein the gradient-index lens has an outer diameter of about 125 µm, a core having a diameter of about 115 µm and a cladding having a width of about 10 µm.

18. The method of claim 17, wherein the gradient-index lens has a length of about 823 µm.

19. The method of claim 15, further comprising optically coupling the gradient-index lens with a sensor capable of monitoring a coupling efficiency to determine when the pitch of the gradient-index lens is one-quarter.

20. An optical coupler for propagating an optical signal having a wavelength, the optical coupler comprising:

an optical fiber having an end-face; and a gradient-index lens attached to the end-face of the optical fiber, the gradient-index lens is optically radiated to increase a pitch of the gradient-index lens.

21. The optical coupler of claim 20, wherein the pitch provides a peak index delta of about 0.9%.

22. The optical coupler of claim 20, wherein the pitch provides a peak index delta of about 1.1%.

* * * * *